United States Patent
Porter et al.

(10) Patent No.: US 7,600,363 B2
(45) Date of Patent: Oct. 13, 2009

(54) EASILY REMOVABLE MOWER CUTTING DECK

(75) Inventors: Todd A. Porter, Rosemount, MN (US); Gregory L. Dineen, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/807,910

(22) Filed: May 30, 2007

(65) Prior Publication Data

US 2008/0295477 A1 Dec. 4, 2008

(51) Int. Cl.
*A01D 34/00* (2006.01)
(52) U.S. Cl. .................................... 56/17.1; 56/DIG. 22
(58) Field of Classification Search ............ 56/DIG. 14, 56/17.1, 14.7, 14.9, 15.7–15.9, 16.3, 16.7
See application file for complete search history.

(56) References Cited

U.S. PATENT DOCUMENTS

| | | | | |
|---|---|---|---|---|
| 2,648,512 | A | * | 8/1953 | Scholin ...................... 248/100 |
| 3,601,958 | A | * | 8/1971 | Roof ........................... 56/13.7 |
| 3,706,186 | A | * | 12/1972 | Hurlburt et al. .............. 56/15.8 |
| 3,719,371 | A | * | 3/1973 | Musgrave ............ 280/124.135 |
| 3,874,150 | A | * | 4/1975 | Boeck ......................... 56/17.1 |
| 3,948,025 | A | * | 4/1976 | Erdman ....................... 56/10.1 |
| 4,869,057 | A | * | 9/1989 | Siegrist ....................... 56/15.9 |
| 4,882,898 | A | * | 11/1989 | Samejima et al. ............. 56/208 |
| 5,025,617 | A | | 6/1991 | Kuhn et al. |
| 5,725,415 | A | * | 3/1998 | Bernhard ..................... 451/45 |
| 5,937,625 | A | * | 8/1999 | Seegert ........................ 56/15.6 |
| 5,956,932 | A | | 9/1999 | Schmidt |
| 6,023,921 | A | * | 2/2000 | Burns et al. .................. 56/16.3 |
| 6,293,077 | B1 | * | 9/2001 | Plas et al. .................... 56/17.1 |
| 6,470,660 | B1 | * | 10/2002 | Buss et al. ................... 56/15.9 |
| 6,584,756 | B2 | * | 7/2003 | Buss .......................... 56/15.6 |
| 6,679,037 | B1 | | 1/2004 | Hitt et al. |
| 6,698,170 | B2 | * | 3/2004 | Tironi ............................. 56/6 |
| 6,868,658 | B2 | * | 3/2005 | Velke et al. .................. 56/15.8 |
| 6,988,351 | B2 | * | 1/2006 | Schick et al. ................ 56/15.9 |
| 7,028,456 | B2 | * | 4/2006 | Thatcher et al. ............. 56/15.6 |
| 7,197,863 | B1 | * | 4/2007 | Sugden ....................... 56/15.9 |
| 2003/0188905 | A1 | | 10/2003 | Buss |

FOREIGN PATENT DOCUMENTS

GB 1390440 4/1975

* cited by examiner

*Primary Examiner*—Thomas B Will
*Assistant Examiner*—Joan D Misa
(74) *Attorney, Agent, or Firm*—James W. Miller (57) ABSTRACT

A rotary cutting deck is suspended from the frame of a lawn mower to hang beneath the frame of the mower between the front and rear ground engaging wheels of the mower. A single front pull arm is pinned by a pivot pin to the front of the cutting deck. This pivot pin can be easily released and pulled by removing a single hairclip pin or cotter pin. The rear of the cutting deck is hung by two downwardly facing suspension hooks onto the cross rod of a pivotal hanger. After the front pull arm is disconnected from the front of the cutting deck, the operator lifts up the rear of the cutting deck to unhook the suspension hooks, pulls the cutting deck slightly rearwardly, and then lowers the cutting deck to the ground to allow the cutting deck to be slid out from underneath the mower after also removing any deck drive belt or similar cutting blade drive system. This can be easily and quickly done.

5 Claims, 10 Drawing Sheets

EASILY REMOVABLE MOWER CUTTING DECK

TECHNICAL FIELD

This invention relates to a lawn mower having a cutting deck carried beneath the frame of the mower between the front and rear ground engaging wheels of the mower. More particularly, this invention relates to a cutting deck that can be quickly and easily installed on or removed from the mower.

BACKGROUND OF THE INVENTION

Lawn mowers that carry a large rotary cutting deck beneath the frame of the mower are well known. The cutting deck is often positioned between a pair of front wheels and a pair of rear drive wheels. When the mower is a riding mower in which an operator sits on a seat located on the frame of the mower, the cutting deck is often positioned beneath at least a portion of the operator's body. This type of cutting deck is sometimes referred to as a belly mounted cutting deck or a mid-mount cutting deck.

Cutting decks of this type usually have a plurality of rotary cutting blades disposed across the width of the deck. The cutting blades rotate about vertical axes and have sharpened cutting edges that rotate in a substantially horizontal cutting plane. As the blades rotate about their vertical axes, grass is cut by impact with the cutting edges of the blades. Cutting decks of this type are called rotary cutting decks because of the rotary nature of the cutting blades.

Cutting decks of this type are also usually suspended beneath the frame of the mower by some type of deck suspension system. The deck suspension system is often vertically adjustable to raise and lower the cutting deck relative to the frame of the mower and thus relative to the ground. This is to adjust the height of cut of the mower. When the cutting deck is lifted to be closer to the mower and further from the ground, the grass is cut at greater heights, and vice versa.

Many different deck suspension systems have been used to mount such cutting decks to the frame of a mower. Almost all such systems have various arrangements of pivotal links, arms, rods, brackets, and the like for suspending the deck beneath the frame of the mower. In addition to being adjustable to provide different heights of cut, such deck suspension systems often allow the cutting deck to pitch up and down or to roll from side to side to accommodate different ground contours. In other words, if one corner of the deck is forced up because of encountering a bump in the ground, it is desirable for that corner of the deck to be able to rise to follow the contour. This prevents the mower from scalping the grass as it travels over the bump. The deck suspension also restricts deck motion front to rear so that tension is maintained on the deck drive belt when a belt and pulley system or the like is used to rotate the cutting blades.

However, the space beneath the frame of the mower in which the cutting deck is carried is quite limited. The task of removing or installing the mower deck in this tight or limited space is difficult. The operator has to be able to reach under the frame of the mower and get to all the different connection points between the deck suspension system and the cutting deck. Then, the operator usually has to use a wrench or some other tool to unbolt or unscrew the connectors between the cutting deck and the deck suspension system. This is not an easy task in most cases.

U.S. Pat. No. 5,956,932 to Schmidt purports to disclose a cutting deck that is removable from beneath the mower frame without using tools. One end of the deck connects to one or more pivotal links using what is termed "quick release" pins. The other end of the deck has some slotted brackets that hook onto a pivotal bar carried on the frame of mower. Once the deck is released from the pivotal links by removing the quick release pins, the mower deck may be slid in a direction that pulls the slotted brackets off the bar to release the other end of the deck.

While Schmidt's cutting deck is theoretically easier to remove than other known cutting decks, removing the deck is not quite as simple as it appears. The reason for this is that part of the height of cut adjustment mechanism obstructs easy removal of the cutting deck from beneath the frame of the mower even after the quick release pins are removed. Thus, in addition to removing the quick release pins and pulling the slotted brackets off the bar, Schmidt requires an intermediate step of repositioning the height of cut adjustment mechanism and the pivotal links themselves so that they are moved clear of the cutting deck. This intermediate repositioning step is a multi-part operation that requires the operator to push up on various vertical lift rods, to then manually slide the lift rods up along the length of the slotted portions of the pivotal links, and to then operate the height of cut adjustment system to lift the lift rods and the pivotal links up out of the way of the mower deck.

SUMMARY OF THE INVENTION

One aspect of this invention relates to a lawn mower that comprises a frame supported for movement over the ground by a plurality of ground engaging wheels. A rotary cutting deck is carried beneath the frame between front and rear ground engaging wheels. A suspension system suspends the cutting deck beneath the frame. The suspension system comprises a pair of suspension hooks at a rear end of the cutting deck for hooking onto a pivotal hanger carried on the frame. A pull arm is attached to the frame and is pivotally connected by a pivot pin to a front end of the frame for pulling the cutting deck forwardly as the frame moves forwardly.

Another aspect of this invention relates to a lawn mower that comprises a frame supported for movement over the ground by a plurality of ground engaging wheels. A rotary cutting deck is carried beneath the frame between front and rear ground engaging wheels. A suspension system suspends the cutting deck beneath the frame. The suspension system connects to the cutting deck at three connections arranged in a triangular configuration. One connection comprises a pivot pin that must be released and pulled from the cutting deck and the other two connections comprise hooks on the cutting deck that must be unhooked from the suspension system to completely disconnect the cutting deck from the suspension system. A height of cut adjustment system is operatively coupled to the suspension system in a location that does not interfere with removal of the cutting deck such that the cutting deck can be disconnected and removed from the deck suspension system by removing and releasing the pivot pin, unhooking the hooks, and then dropping the cutting deck from the deck suspension system without having to manually reposition any components in the height of cut adjustment system.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
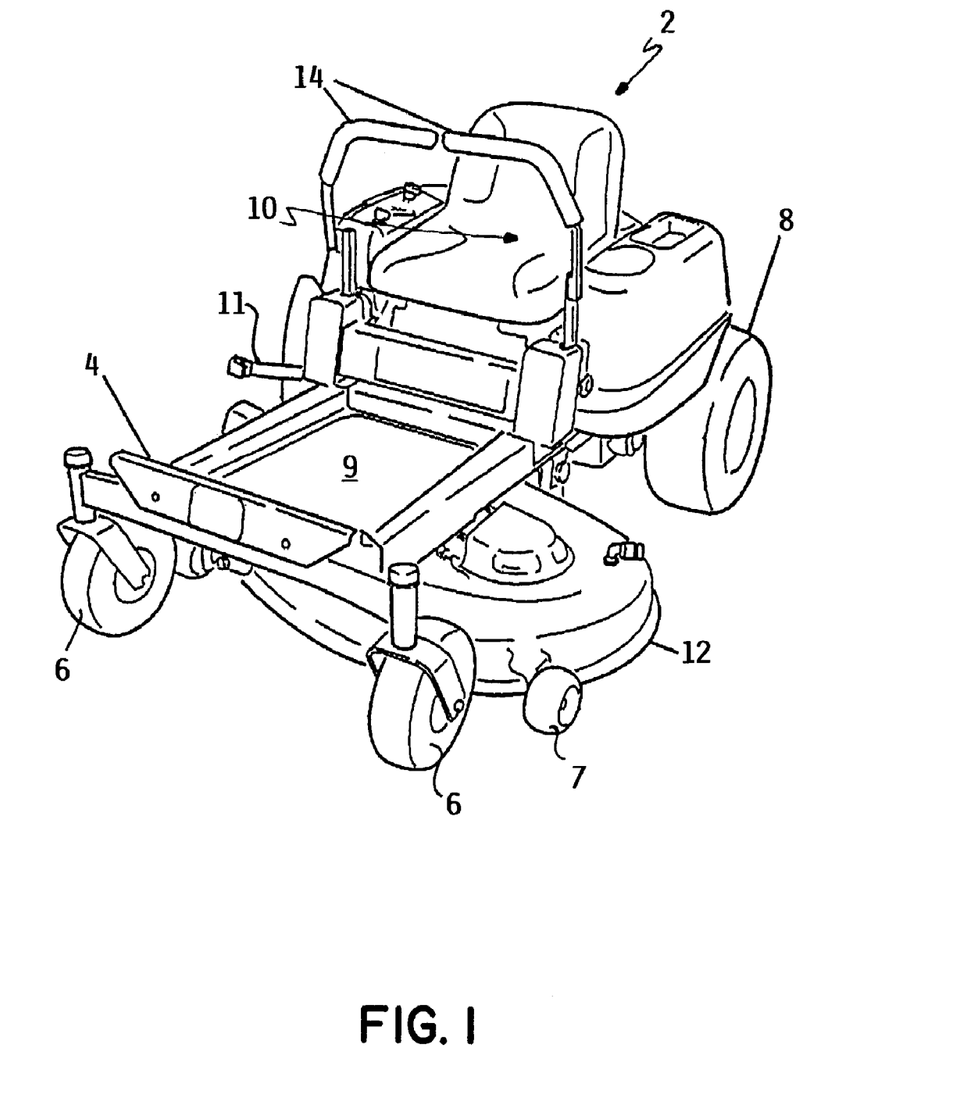
FIG. 1 is a perspective view of a lawn mower equipped with an easily removable cutting deck according to this invention.
Figure 2:
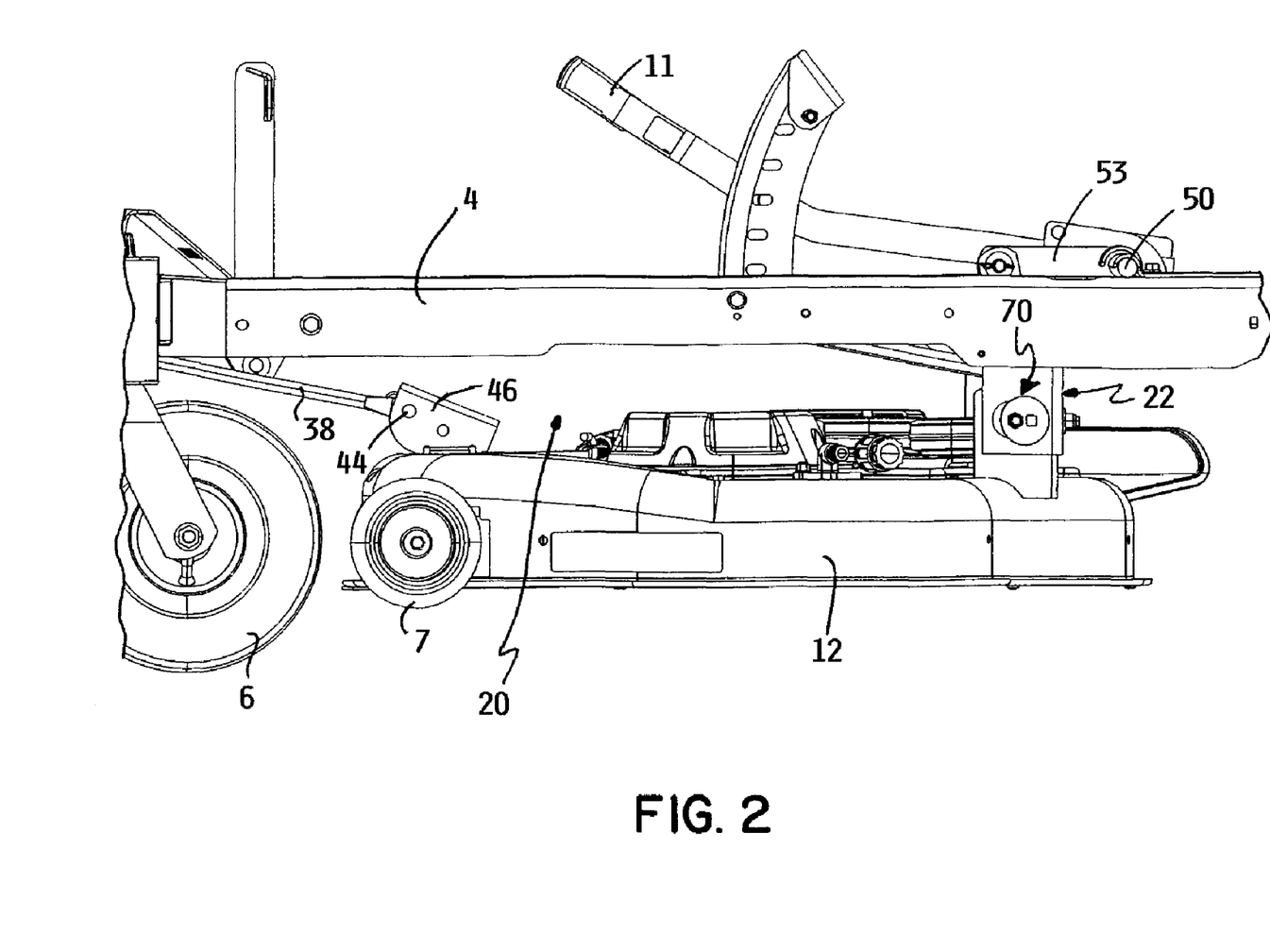
FIG. 2 is a side elevational view of a portion of the mower of FIG. 1, particularly illustrating the cutting deck installed on the mower.

FIG. 1 illustrates an outdoor power equipment unit comprising a riding mower 2. Mower 2 includes a frame 4 supported for movement over the ground by a pair of front caster wheels 6 and a pair of rear drive wheels 8. An operator's station defined by a floorboard 9 and a seat 10 is provided on frame 4 for supporting a seated operator. An internal combustion engine or the like (not shown) is provided on the rear of frame 4 behind seat 10 to power mower 2.

A cutting deck 12 is mounted beneath frame 4 between front caster wheels 6 and rear drive wheels 8 for mowing grass or the like. Mower 2 includes two control sticks 14 for allowing the operator to cause mower 2 to move in forward and reverse and to steer mower 2. Mower 2 as depicted herein is for illustrative purposes only. Mower 2 may have different forms, numbers and arrangements of ground engaging wheels, drive and steering systems, etc. This invention relates to a suspension system 20 for suspending cutting deck 12 beneath frame 4 of mower 2.

Figure 3:
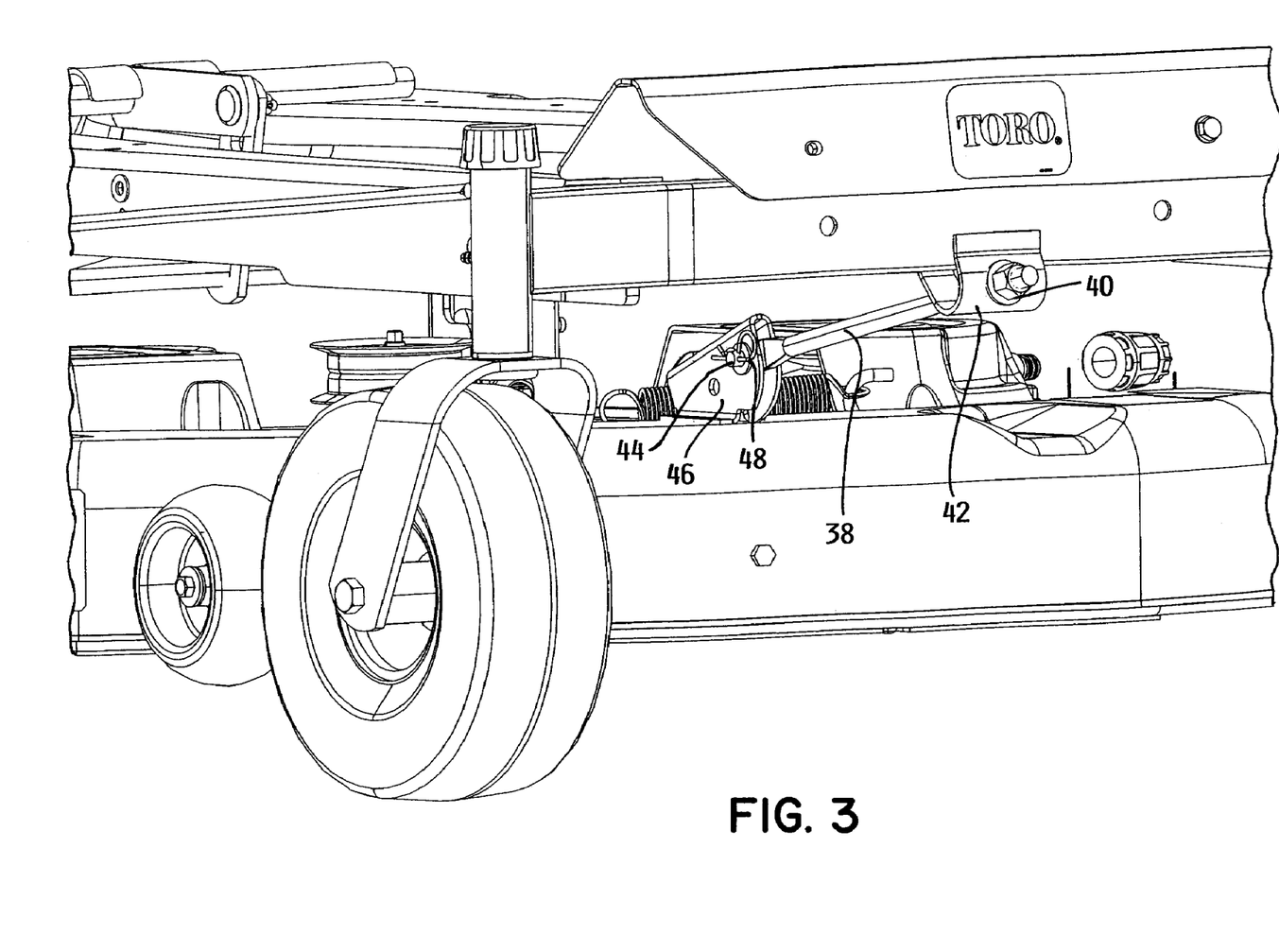
FIG. 3 is a perspective view of a portion of the mower of FIG. 1, particularly illustrating the front pull arm that suspends the front of the cutting deck and pulls the cutting deck forwardly as the mower moves forwardly.
Figure 4:
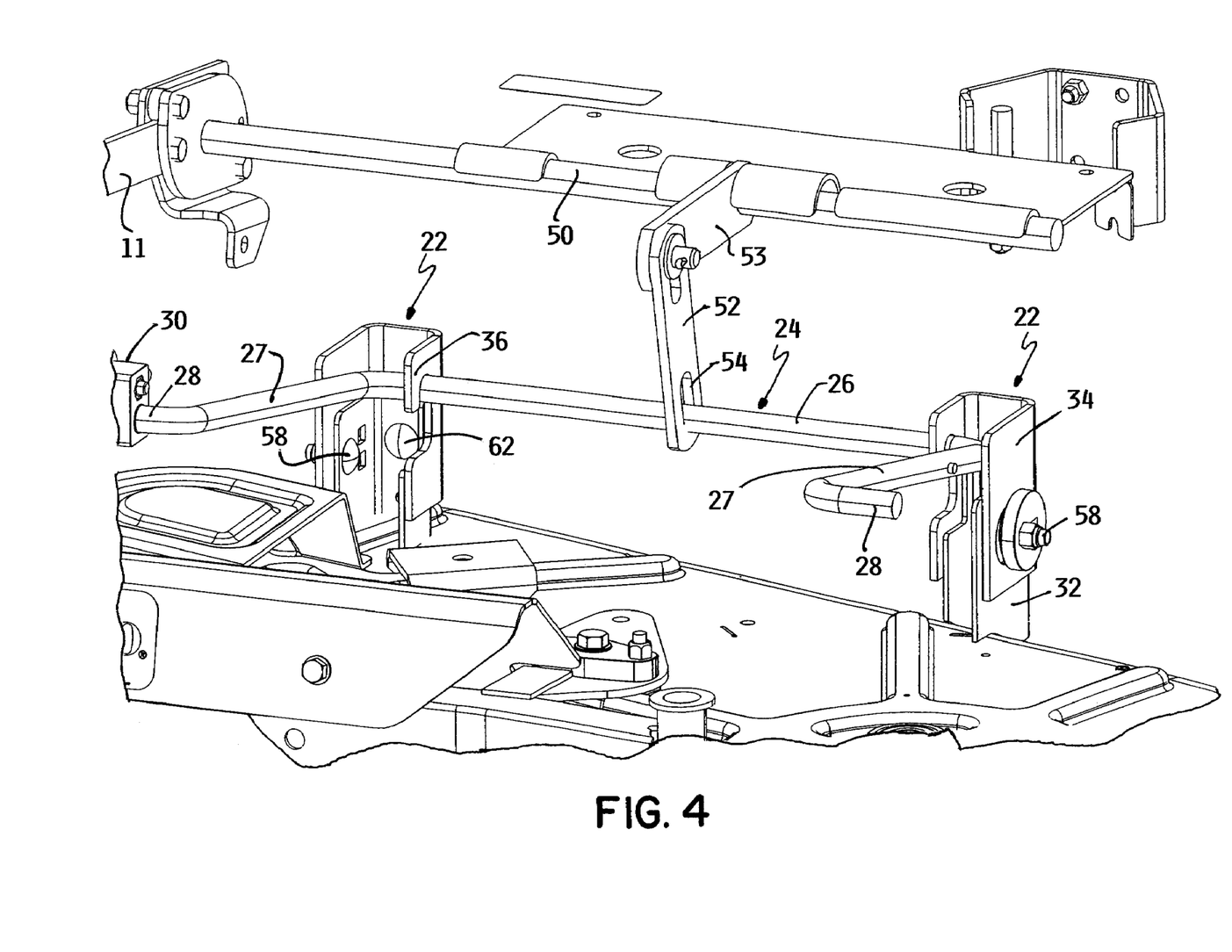
FIG. 4 is a perspective view of a portion of the mower of FIG. 1, particularly illustrating a pivotal rear hanger and a pair of rear suspension hook assemblies having downwardly facing hooks that hook onto the hanger to suspend the rear of the cutting deck from the hanger.

Referring first to FIGS. 3 and 4, suspension system 20 of the this invention comprises a pair of rear suspension hook assemblies 22 that suspend the rear of cutting deck 12 from a pivotal, U-shaped hanger 24. Hanger 24 has a laterally extending cross rod 26 with forwardly extending longitudinal arms 27. Each longitudinal arm 27 of hanger 24 has an outwardly turned end 28 that is pivotally received in a pivot mount or bearing block 30 fixed or carried on frame 4. FIG. 4 illustrates hanger 24 with bearing block 30 removed on one side so as to illustrate the outwardly turned end 28 on longitudinal arm 27. Bearing block 30 for the other arm 27 has been left in place in FIG. 4. Hanger 24 is thus free to pivot up and down about the transverse pivot axis defined by the outwardly turned ends 28 of hanger arms 26.

Figure 5:
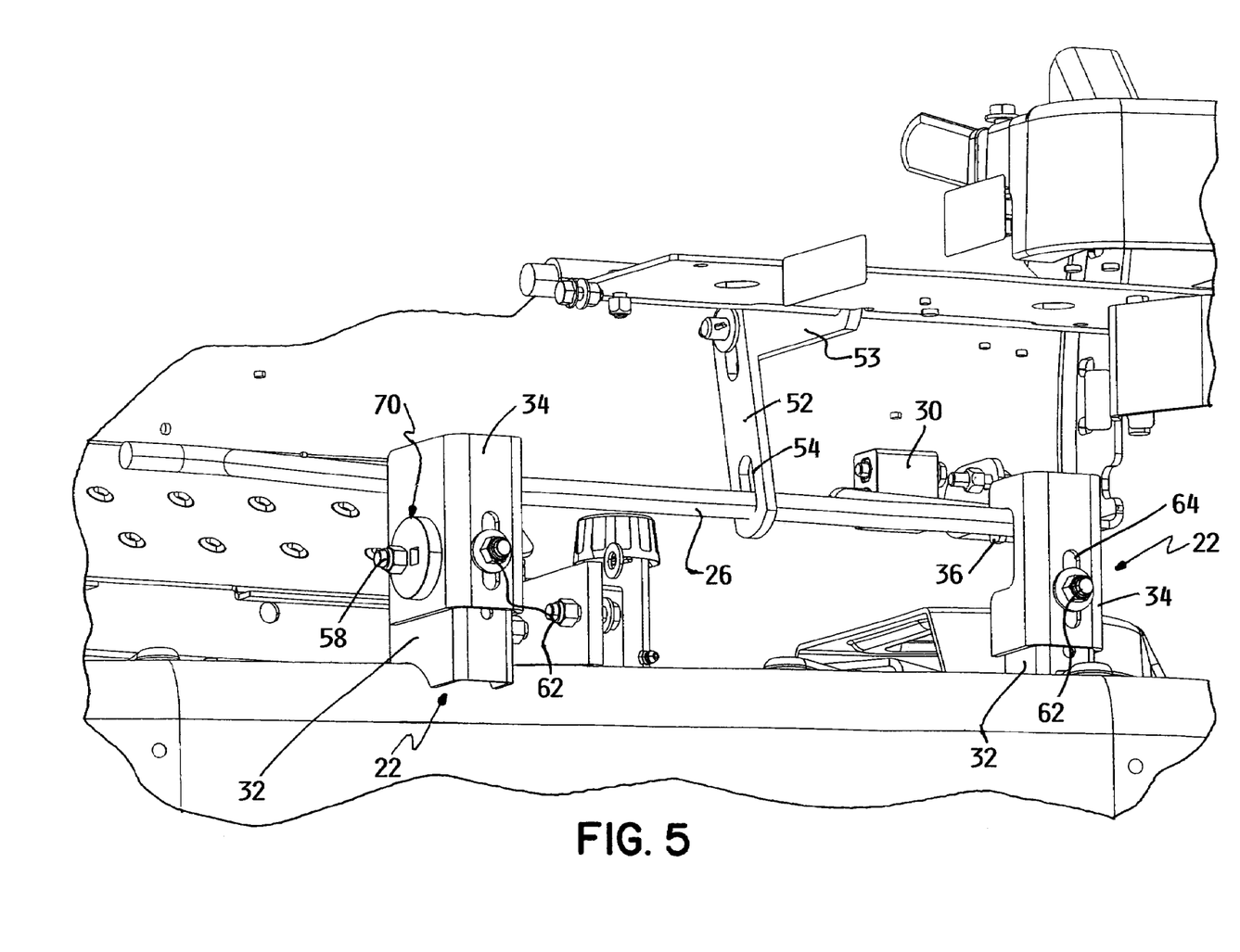
FIG. 5 is a perspective view similar to FIG. 4, but particularly illustrating the rear hanger and the rear suspension hook assemblies from behind the cutting deck.
Figure 6:
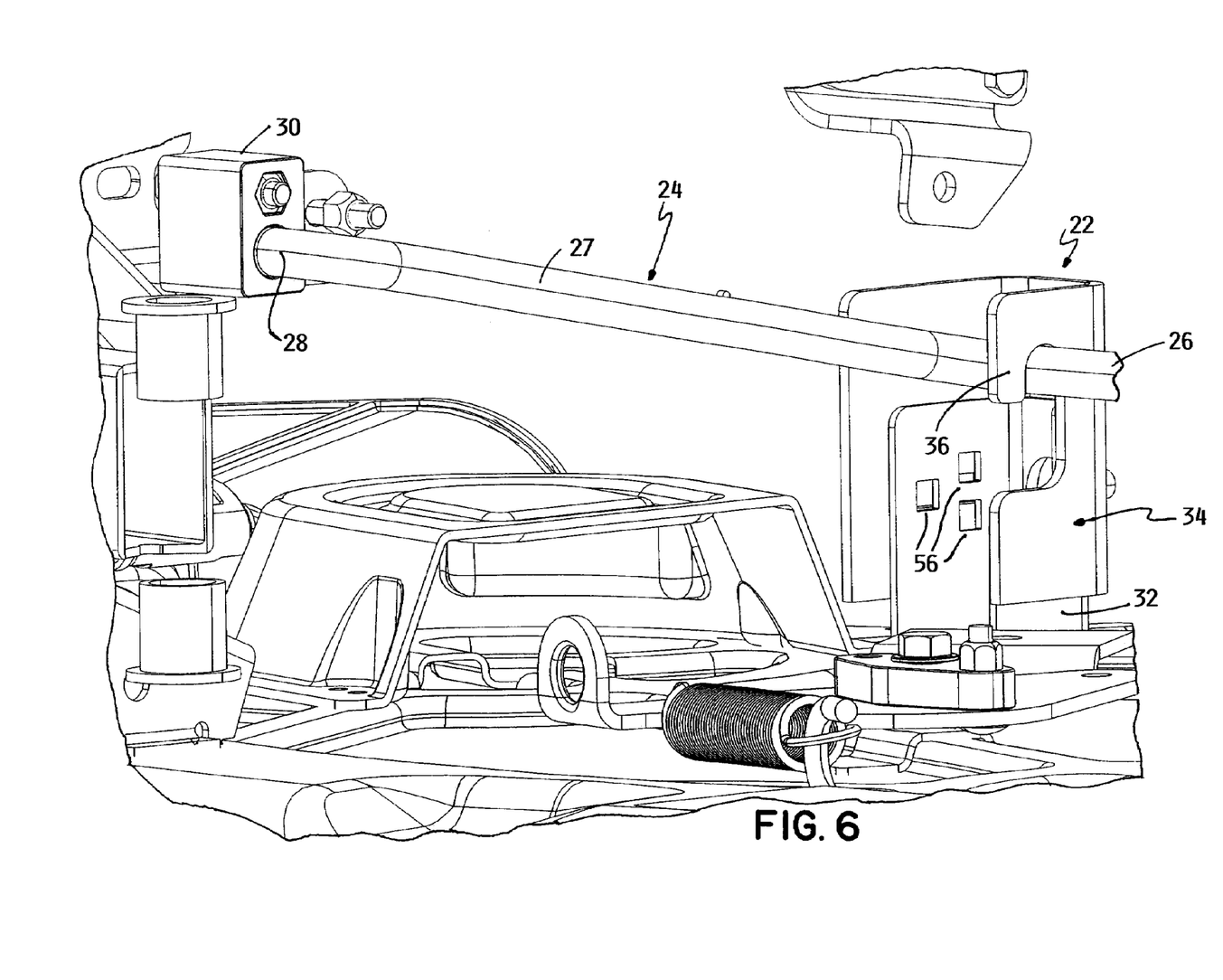
FIG. 6 is an enlarged partial perspective view of one of the rear suspension hook assemblies shown in FIGS. 4 and 5, particularly showing three height adjustment holes for adjusting the height of the suspension hook.
Figure 7:
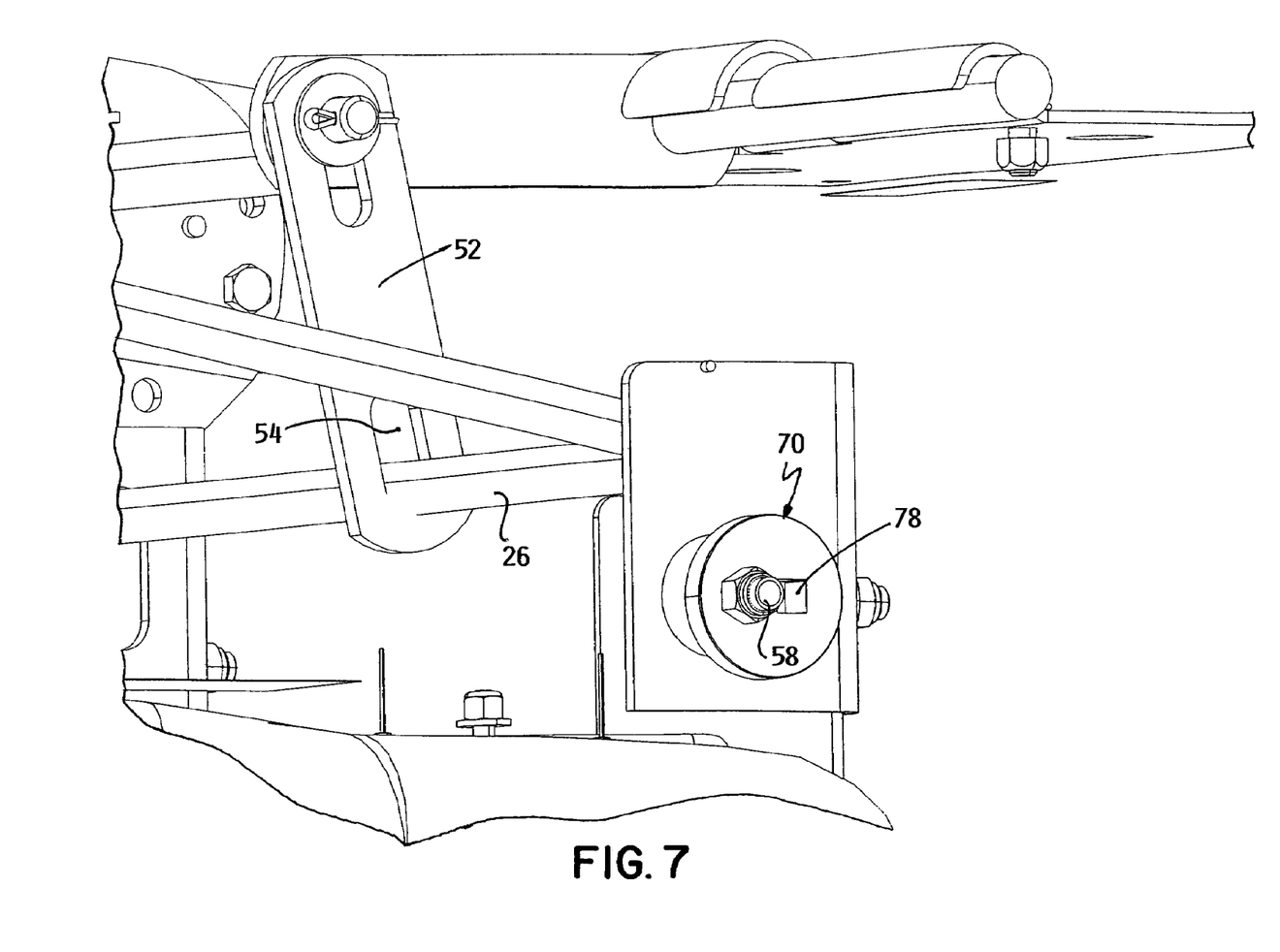
FIG. 7 is an enlarged perspective view of the other rear suspension hook assembly shown in FIGS. 4 and 5, particularly illustrating the rotatable cam for adjusting the height of the suspension hook for deck leveling purposes.

Each rear suspension hook assembly 22 is a two-part assembly comprising a lower post 32 that is fixed to the rear of cutting deck 12 and an upper member 34 that is vertically slidable on lower post 32. Both lower post 32 and upper member 34 are channel shaped in cross-section with the channel shape of upper member 34 concentrically nesting around and sliding on the channel shape of lower post 32. Upper member 34 has an inner wall that is slotted to form a downwardly facing, J-shaped suspension hook 36. As shown in FIGS. 4-6, suspension hooks 36 hang on cross rod 26 of hanger 24 when cutting deck 12 is suspended beneath frame 4 of mower 2.

Referring now to FIG. 3, suspension system 20 also includes a front pull arm 38 that suspends the front of cutting deck 12 beneath frame 4 of mower 2. Pull arm 38 is bolted by a nut 40 to a U-shaped bracket 42 carried on the front of frame 4 of mower 2. The rear wall of bracket 42 is slotted to permit pull arm 38 to rock or pivot somewhat up and down about its connection point to the front wall of bracket 42. The rear of pull arm 38 is pivotally connected by a pivot pin 44 to a bracket or clevis 46 that is fixed to the front and top of cutting deck 12. Pivot pin 44 that pins pull arm 38 to the front of cutting deck 12 is held in place by a single hairpin clip or cotter pin 48.

As can be appreciated herein, cutting deck 12 is suspended by suspension system 20 from frame 4 at three points, namely where pull arm 38 connects to the front of cutting deck 12 and where the two downwardly facing hooks 36 of the rear suspension hook assemblies 22 hook onto hanger 24. These three suspension points are arranged in a triangular configuration with the attachment of pull arm 38 to cutting deck 12 lying generally along the centerline of cutting deck 12 and the two downwardly facing hooks 36 being spaced laterally to opposite sides of the centerline of cutting deck 12. Pull arm 38 is effective to transfer the propulsive force of frame 4 of mower 2 to cutting deck 12 to pull and propel cutting deck 12 along with mower 2.

Mower 2 also has a height of cut adjustment system that includes a pivotal handle 11 that the operator can swing or pivot upwardly and downwardly from seat 10 to change the height of cut afforded by cutting deck 12. Handle 11 is effective to rotate a cross shaft 50 carried on frame 4 of mower 2 generally above the rear of cutting deck 12. A slotted link 52 is pivotally carried on an arm 53 that is fixed to cross shaft 50 to rotate therewith. Cross rod 26 of hanger 24 passes through a lower slot 54 in link 52.

As the operator swings or pivots handle 11 to rotate cross shaft 50, the rotation of cross shaft 50 lifts or lowers link 52 depending upon the direction of rotation of cross shaft 50. This pulls up on hanger 24 or allows hanger 24 to fall downwardly depending upon whether link 52 is being lifted or lowered as the force of gravity keeps cross rod 26 seated against bottom of slot 54. Moving hanger 24 upwardly or allowing hanger 24 to descend in concert with movement of link 52 also vertically adjusts cutting deck 12 upwardly and downwardly to adjust the height of cut. Slot 54 allows cutting deck 12 to roll or tilt somewhat from side-to-side to follow ground contours since hanger 24 can roll or tilt within slot 54.

It should be noted that cutting deck 12 when suspended by suspension system 20 will normally be suspended above and out of contact with the ground in most of the heights of cut that can be selected by the different positions of handle 11. Cutting deck 12 carries anti-scalp wheels 7 that can momentarily or periodically engage the ground when the ground contours change sufficiently. Anti-scalp wheels 7 thus thereby momentarily lift one side or the other of cutting deck 12 to prevent scalping in undulating or bumpy terrain.

Rear suspension hook assemblies 22 have a novel means for leveling cutting deck 12 from side to side. One rear suspension hook assembly 22 has a plurality of square height adjustment holes 56 in lower post 32 that non-rotatably receive the shank of a bolt 58. Bolt 58 passes through one hole 56 in lower post 32 and then out through a single hole in an outer wall of upper member 34. When a nut is tightened on the outer end of bolt 58, bolt 58 will firmly clamp upper member 34 to lower post 32. For additional clamping force to securely hold upper member 34 to lower post 32, an additional securing bolt 62 passes through an elongated slot 64 on the rear wall of upper member 34. See FIG. 5.

The square height adjustment holes 56 are shown in FIG. 6 without bolt 58 in place so as to better illustrate all three holes 56. When mower 2 is manufactured, bolt 58 is originally installed in the middle of the three height adjustment holes 56. This placement of bolt 58 in middle hole 56 is illustrated in FIG. 4.

The other rear suspension hook assembly 22 is provided with a rotatable cam 70 that when loosened and rotated can slide upper member 34 upwardly and downwardly as need be to precisely level cutting deck 12 from side to side. In this suspension hook assembly 22, lower post 32 now has only a single height adjustment hole 56 set at the same level as the middle height adjustment hole 56 in the first suspension hook assembly 22. A bolt 58 passes through this height adjustment hole 56.

Figure 8:
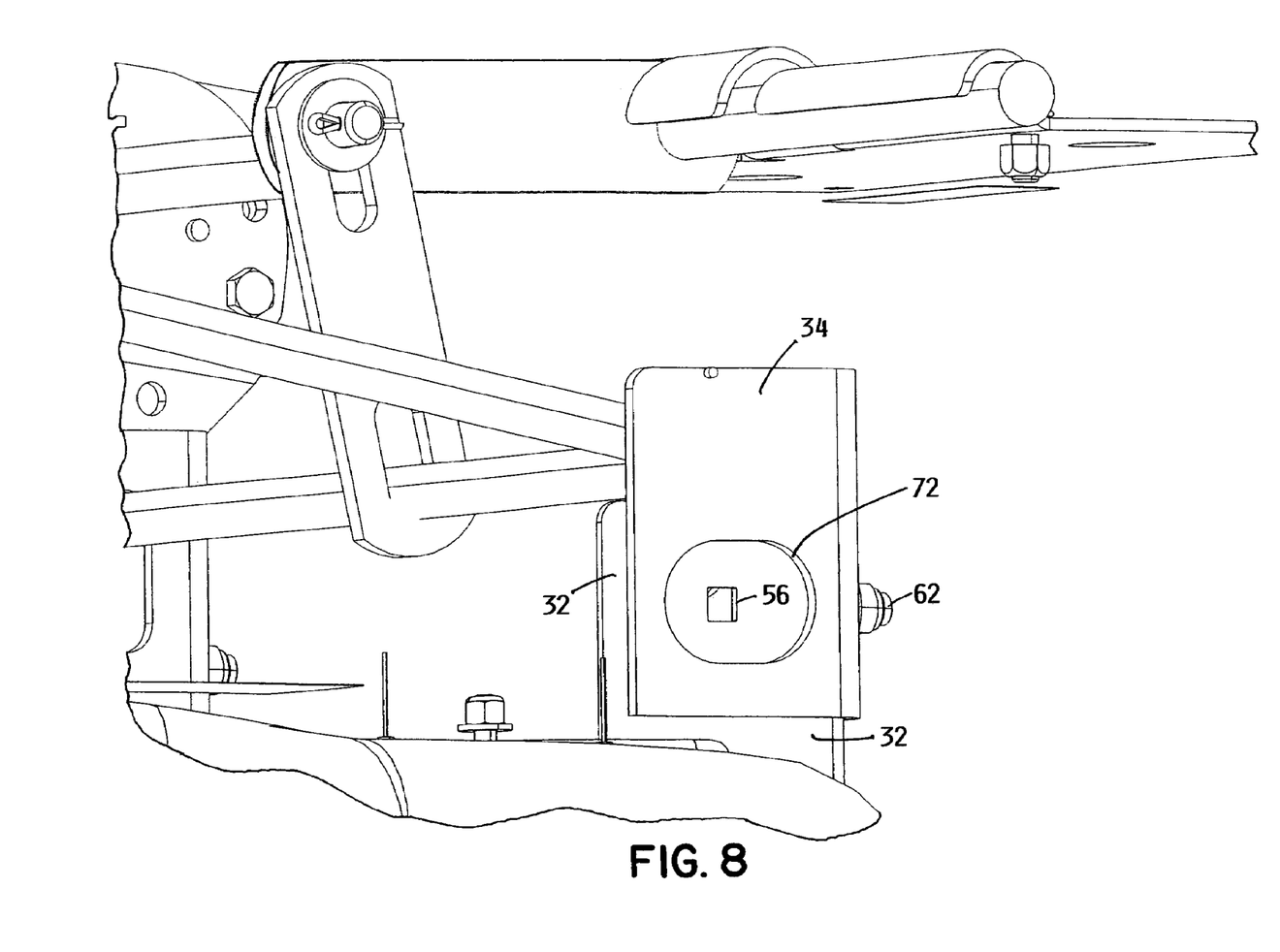
FIG. 8 is an enlarged partial perspective view similar to FIG. 7, particularly illustrating the rotatable cam removed from the rear suspension hook to illustrate the cam track that receives a portion of the rotatable cam.
Figure 9:
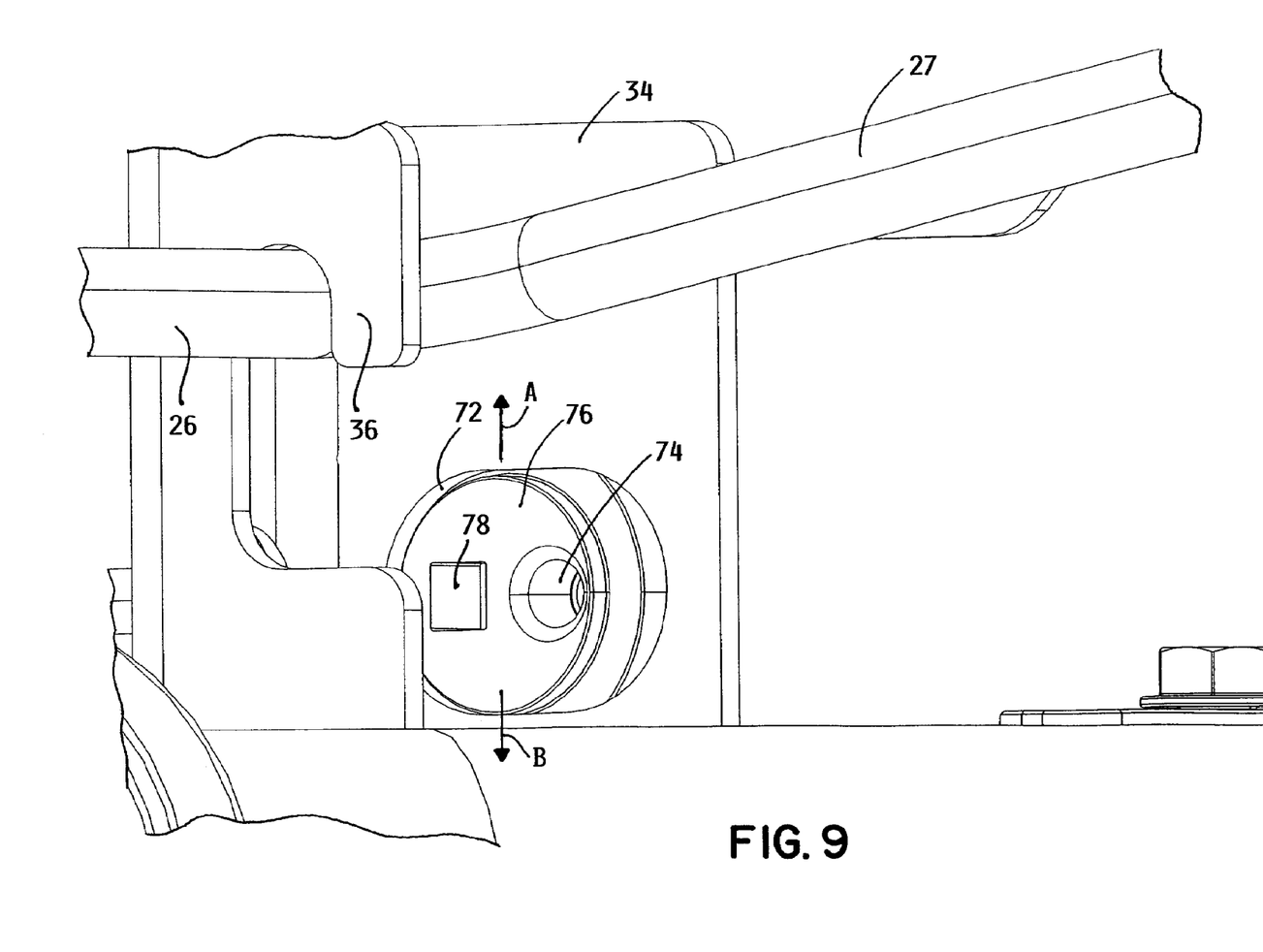
FIG. 9 is an enlarged partial perspective view similar to FIG. 7, particularly illustrating the rear suspension hook assembly of FIG. 8 from the other side thereof and with the rotatable cam in place in the cam track provided therefor.
Figure 10:
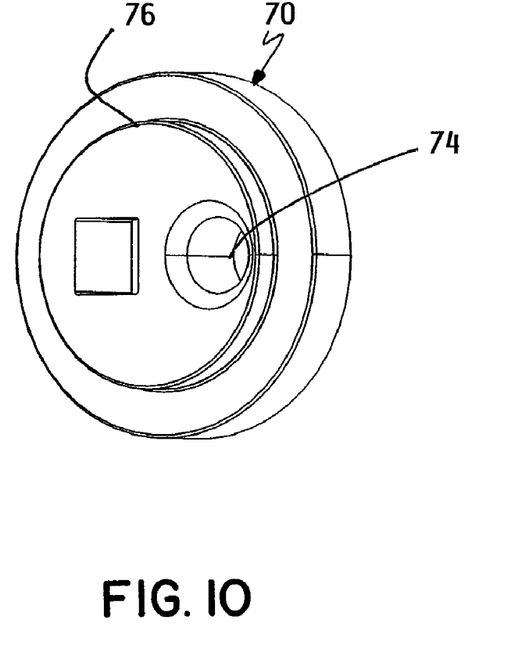
FIG. 10 is a perspective view of the rotatable cam used to adjust the height of the suspension hook shown in FIGS. 7-9.

However, instead of simply being received in another hole in the outer wall of upper member 34, the outer wall of upper member 34 has a racetrack shaped cam track 72 through which bolt 58 extends. See FIG. 8. Bolt 58 then passes through a bore 74 in cam 70 that is set off center or to one side of cam 70. Cam 70 includes a circular eccentric 76 that fits or nests within cam track 72. See FIG. 9 which shows eccentric 76 abutted against one side of cam track 72 with bolt 58 having been removed from FIG. 9 so as not to obscure cam track 72 or the nesting relationship of eccentric 76 within cam track 72. Cam 70 also includes an aperture 78 to allow the operator to insert some type of tool, like the tip of a screwdriver, into aperture 78 to apply torque to cam 70 to rotate cam 70.

When the nut on the outer end of bolt 58 is loosened (along with the nut on auxiliary holding or clamping bolt 62 on the rear wall of suspension hook assembly 22), the operator can insert a tool into aperture 78 and rotate cam 70 either upwardly or downwardly depending upon which direction of motion is needed to level cutting deck 12. Since bolt 58 itself can't move vertically as it is vertically fixed by the single square height adjustment hole 56 in lower post 32, the rotary motion of cam 70 causes eccentric 76 to push upwardly or downwardly on cam track 72 to slide upper member 34 either upwardly or downwardly relative to lower post 32. This is illustrated by the arrows A and B in FIG. 9. The operator rotates cam 70 by an amount that achieves leveling of cutting deck 12 from side to side as determined by a level measuring device placed on top of cutting deck 12.

In most cases, leveling of cutting deck 12 can be achieved with the first suspension hook assembly 22 having bolt 58 pass through middle hole 56 and by simply rotating cam 70 in the other suspension hook assembly 22. However, if deck leveling is not achieved with cam 70 having rotated through its entire angular range of motion, then bolt 58 in the first suspension hook assembly 22 might have to be inserted into one of the other two height adjustment holes 56 provided therefor. After such bolt 58 is so repositioned, cam 70 would then be readjusted to level cutting deck 12.

Suspension system 20 of this invention is advantageous because cutting deck 12 is extremely easy to remove and install. If one wishes to remove cutting deck 12, one can lower cutting deck 12 to its lowest height of cut position and then, if need be, place a block of wood or the like beneath cutting deck 12 to relieve some of the weight of cutting deck 12. The operator can then easily unhook pull arm 38 from the front of cutting deck 12 simply by removing hairclip pin or cotter pin 46 and pulling out pivot pin 44. The block of wood can be removed. Then, the operator need only lift up on the rear of cutting deck 12 to unhook both suspension hooks 36 from hanger 24 and then pull cutting deck 12 slightly rearwardly until suspension hooks 36 clear hanger 24. Cutting deck 12 can then be lowered down onto the ground and subsequently slid clear of frame 4 of mower 2.

The above procedure would also inherently include the step that whatever drive system is used to power or rotate the cutting blades on cutting deck 12 must also be disconnected. For example, in mower 2, a belt and pulley or similar system is used to rotate the cutting blades which system includes a deck drive belt that must also be disconnected from a clutch to completely remove cutting deck 12 from mower 2. However, the need to disconnect drive components would be true for all cutting decks 12 since some means must be present to drive the cutting blades. Accordingly, for the sake of a like comparison, the step of disconnecting the blade drive system has not been included as it is not strictly part of the procedure needed to remove the deck from suspension system 20.

Thus, with the removal of a single hairclip pin or cotter pin 46 and then by pulling a single pivot pin 44, cutting deck 12 can be quickly and easily removed. In addition, there are no other mower components that need to be repositioned to allow removal of cutting deck 12. In this invention, the connection between the height of cut adjustment system and suspension system 20, namely slotted link 52 connecting to hanger 24, does not need to be moved or rearranged at all during removal of cutting deck 12 as it is already located up and out of the way. Cutting deck 12 of this invention can be more easily and simply removed and installed from mower 2 than prior art cutting decks.

In addition, the deck leveling system described herein has various advantages. Leveling of cutting deck 12 can be conveniently done from one side of mower 2 simply by loosening the nut on one of the bolts 58 and then rotating cam 70 upwardly or downwardly. This can all be done from one side of cutting deck 12 as cam 70 is on the outer wall of upper member 34 and faces outwardly to the side. The auxiliary holding or clamping bolts 62 used in suspension hook assemblies 22 are similarly easily accessible from the rear of cutting deck 12.

Various modifications of this invention will be apparent to those skilled in the art. Thus, the scope of the invention shall be limited only by the appended claims.

We claim:

1. A lawn mower, which comprises:
   (a) a frame supported for movement over the ground by a plurality of ground engaging wheels;
   (b) a rotary cutting deck carried beneath the frame between front and rear ground engaging wheels; and
   (c) a suspension system for suspending the cutting deck beneath the frame, the suspension system comprising:
      (i) a pair of suspension hooks at a rear end of the cutting deck for hooking onto a pivotal hanger carried on the frame, wherein both of the suspension hooks are independently adjustable in height relative to the cutting deck, wherein one suspension hook is adjustable in height in discrete increments relative to the cutting deck and the other suspension hook is adjustable in infinite increments relative to the cutting deck; and (ii) a pull arm attached to the frame and pivotally connected by a pivot pin to a front end of the cutting deck for pulling the cutting deck forwardly as the frame moves forwardly.

2. The mower of claim 1, wherein the one suspension hook is adjustable by being connected to one of a plurality of discrete height adjustment holes, and the other suspension hook is adjustable by rotating a rotatable cam.

3. The mower of claim 1, further including a height of cut adjustment system operatively coupled to the pivotal hanger for raising and lowering the height of the cutting deck relative to the ground.

4. The mower of claim 3, wherein the height of cut adjustment system includes a slotted link connected to the pivotal hanger for lifting and lowering the pivotal hanger when the height of cut adjustment system is selectively operated by an operator.

5. The mower of claim 4, wherein the slotted link has a vertically extending slot with the hanger resting against a bottom end of the slot.

\* \* \* \* \*